(12) United States Patent
Deleris et al.

(10) Patent No.: US 8,475,615 B2
(45) Date of Patent: Jul. 2, 2013

(54) METHOD FOR REPAIRING A WALL CONSISTING OF A PLURALITY OF LAYERS

(75) Inventors: Michel Deleris, Rebigue (FR); Francois Cenac, Toulouse (FR)

(73) Assignees: Jedo Technologies, Labeqe (FR); Universite Paul Sabatier, Toulose Cedex (FR); Composite Expertice & Solutions, Labeqe (FR)

( * ) Notice: Subject to any disclaimer, the term of this patent is extended or adjusted under 35 U.S.C. 154(b) by 0 days.

(21) Appl. No.: 13/389,080

(22) PCT Filed: Jul. 28, 2010

(86) PCT No.: PCT/EP2010/004626
§ 371 (c)(1),
(2), (4) Date: Feb. 6, 2012

(87) PCT Pub. No.: WO2011/018163
PCT Pub. Date: Feb. 17, 2011

(65) Prior Publication Data
US 2012/0132344 A1    May 31, 2012

(30) Foreign Application Priority Data

Aug. 12, 2009  (FR) ...................... 09 03941

(51) Int. Cl.
*B23C 3/16*  (2006.01)
(52) U.S. Cl.
USPC ............ 156/98; 156/94; 156/36.1; 156/63.2; 156/250; 156/257; 52/514; 29/402.09; 29/402.1; 51/119; 51/120; 51/165; 51/89

(58) Field of Classification Search
USPC ...... 156/94, 36.1, 63.2, 250, 257, 98; 52/514; 29/402.09, 402.1; 51/119, 120, 165, 89
See application file for complete search history.

(56) References Cited

U.S. PATENT DOCUMENTS

| | | |
|---|---|---|
| 4,916,880 A | 4/1990 | Westerman |
| 5,207,541 A | 5/1993 | Westerman |
| 2008/0281554 A1 | 11/2008 | Cork |

OTHER PUBLICATIONS http://www.sciencedirect.com/science/article/pii/S1359835X09000451; Wang et al. ; Optimum Shapes of Scarf Repairs; Feb. 2009.*
http://www.sciencedirect.com/science/article/pii/S1359835X09000451; Tacheron et al. ; Waterjet Techniques for Composite-Material Jet Engine Component Repair; Jun. 1996.*

* cited by examiner

*Primary Examiner* — Jeff Aftergut
*Assistant Examiner* — Jaeyun Lee
(74) *Attorney, Agent, or Firm* — DeFillo & Associates, Inc.; Evelyn A. DeFillo (57) ABSTRACT

The invention relates to a method for repairing a wall (1), including a plurality of layers (2), each layer including fibers (3) extending in a main direction (4), and having a damaged area (5) over a plurality layers (2). The repair method includes a material removal step comprising making a recessed area (6) encircling the damaged area (5) and comprising a peripheral area (7) including steps (8) and adapted such that each step defines an interface area (9) having a width (10), the dimension of which in the main direction of the fibers of the lower layer adjoining the interface area (9) is greater than the dimension of said width in directions other than the main direction (4), a step of producing a replacement part (12) suitable for obstructing the recessed area, and a step of assembling the replacement part (12) onto the wall.

8 Claims, 4 Drawing Sheets

METHOD FOR REPAIRING A WALL CONSISTING OF A PLURALITY OF LAYERS

CROSS REFERENCE TO RELATED APPLICATION

This application is a national stage entry of PCT/EP2010/004626 filed Jul. 28, 2010, under the International Convention claiming priority over French Patent Application No. 0903941 filed Aug. 12, 2009.

TECHNICAL FIELD OF THE INVENTION

The invention concerns a method for repairing a wall consisting of a plurality of layers, notably a composite wall, and having a damaged area affecting a plurality of layers.

PRIOR ART

In the last twenty years, the use of structures consisting of a plurality of layers, and in particular of composite structures, has significantly increased.

Such structures have a high strength to weight ratio, which notably makes their use particularly beneficial in fields such as aeronautics where weight is an issue.

This generalization of the use of multilayer structures leads to an increasing need to develop technologies relating to this type of structure, notably assembly or repair techniques.

Where repairs are concerned, there exists a plurality of methods.

Repairing by "patching" consists in filling the damaged area of the composite surface and attaching a replacement part, commonly called a patch, to the surface of the filled area. This technique is the simplest and the fastest. However, the repaired structure is thicker and heavier than the original structure. Moreover, the adhesion of the patch is not optimal.

The so-called "scarf repair" method consists in removing material from around the damaged area to create a hollowed out area in the wall. Material is typically removed leaving a bevel or steps. At a second stage, a replacement part is attached. The hollowed out area and the replacement part are generally of cylindrical shape.

The repaired structure then has the same thickness as the original structure. Moreover, this type of repair offers a better result in terms of adhesion. However, it is more complicated to carry out and more costly because of the cost of composite material.

Finally, a wall repaired in this was does not have the same mechanical characteristics as the original structure.

SUMMARY OF THE INVENTION

The invention aims to remedy the drawbacks referred to above.

The invention aims in particular to propose a method for repairing a wall consisting of a plurality of layers enabling material savings to be achieved. The invention is also and more particularly directed to proposing a solution of this kind that has mechanical characteristics and in particular a mechanical strength substantially identical to those of the original wall.

To this end, the invention provides a method of repairing a wall, notably a composite wall, consisting of a plurality of layers, each layer comprising fibers extending in a main direction, and having a damaged area affecting a plurality of layers, said repair method comprising a material removal step consisting in hollowing out the wall in such a fashion as to produce a hollowed out area encompassing the damaged area and including a peripheral area consisting of steps the height of which is equal to the thickness of at least one layer and such that each step defines a peripheral area, called an interface area, coplanar with a junction plane between two superposed layers, referred to as lower and upper layers, respectively lying below and above said junction plane, a step of producing a replacement part adapted to block the hollowed out area and including, for each level of the hollowed out area a complementary face covering said level, and a step of assembling the replacement part to the wall.

The fibers of each layer extend totally or mainly in one direction. By the main direction of the fibers is therefore meant the direction of the fibers if all the fibers extend in the same direction or the majority direction of the fibers.

The terms above, below, lower, upper are used with reference to the upper face of the wall.

By replacement part is meant a part constituted of one piece or of an assembly of individual pieces.

According to the invention, during the removal step, steps are defined each defining an interface area having a width greater in the main direction of the fibers of the lower layer adjoining said interface area than said width in directions other than the main direction.

The above method relies on a standard method that comprises a step of machining the damaged area beforehand, the production of a replacement part, also referred to as a patch, and then assembling this replacement part to the hollowed out area.

The material is removed in a staircase or step configuration.

The hollowed out area is designed so that each step at its periphery is a function of the shape of the damaged area and of the nature of the various layers.

The production of the hollowed out area is therefore more refined. This method also enables a hollowed out area to be produced that may take account of the presence of singularities at the level of the wall. In the presence of a rivet or a corner, for example, the shape of one or more steps could be modified.

Moreover, producing steps each defining an interface area having a width in the main direction of the fibers of the lower layer adjoining said interface area greater than said width in directions other than the main direction makes it possible to optimize the material removed and therefore to achieve savings in materials at the same time as retaining characteristics as close as possible to the original wall.

The inventors have found that removing material modifies the flow of forces and have attempted to take account of these localized modifications in order to improve the take-up of the flows of forces between the layers and thereby to improve the mechanical characteristics of the wall when repaired.

Thus the inventors have discovered that, in contrast to the received wisdom in the art, which has deemed the local forces to be negligible, these local forces play a fundamental role at the level of the mechanical characteristics of the repaired walls.

The inventors have also discovered that the forces are taken up primarily at the level of the interface areas and in the direction of the fibers with which the replacement part is in contact and thus in the direction of the fibers of the lower layer that adjoin said interface areas.

The local flow of forces sometimes suffers slight variations and is not oriented in a direction strictly identical to the direction of the fibers, but even if slight local variations exist, the local flows of forces are still exerted in a direction substantially identical to the direction of the fibers. The expression "in the main direction of the fibers" consequently means in a direction substantially identical to this direction once the slight variations of local forces are taken into account.

Producing an interface area that is larger in the direction of the fibers with which the replacement part is in contact enables an optimum area of contact to be obtained between the wall and the replacement part in the direction in which the local forces are exerted.

The width of the interface area in the other directions is minimized, but nevertheless remains sufficient to enable good adhesion between the replacement part and the wall.

Thus there is obtained a repair method that offers optimum take-up of forces and that is more economic than standard methods in terms of the cost of materials.

Moreover, minimizing the removal of material reduces the risk of degrading the integrity of the wall.

Finally, the less volume of material is removed, the faster the material removal step.

It is to be noted that this method may be extrapolated to assembling a part consisting of a plurality of layers with a second part preferably also consisting of a plurality of layers, for example an assembly of two composite parts.

The repair method is nothing other than a method of assembling a first part that is the wall and a second part that is the replacement part.

Unlike repairs, which are generally carried out in a small area in which the general flow of forces exerted is substantially the same at every point, assembly may be carried out over a relatively large area over which the general flow of the forces exerted varies. It is therefore necessary beforehand to divide the assembly area into a plurality of smaller sub-areas over which the general flow of the forces exerted is substantially the same at every point.

The procedure for each sub-area is then similar to the repair procedure.

Thus the assembly method comprises a step of dividing the assembly area into sub-areas; for each sub-area, the assembly method comprises a step of producing a first junction area on a first part consisting in removing material from said first part in such fashion as to produce a first junction area consisting of steps, each step having a height equal to the thickness of at least one layer, so that each step defines an interface area, as defined for the repair method, a step of producing a second part adapted to be assembled to the first junction area and including, for each interface area of the first junction area, a complementary face covering said interface area, a step of bringing the two parts into contact, and a step of fixing the two parts brought into contact by means of the adhesive substance.

As in the repair method, during the step of the assembly method consisting in producing the first part, steps are produced each defining an interface area having a greater width in the main direction of the fibers of the lower layer adjoining said interface area then said width in directions other than the main direction.

According to the invention, during the material removal step, steps are advantageously produced each defining an interface area having a width between a maximum value selected for the main direction of the fibers of the lower layer adjoining said interface layer and a minimum value selected for the direction perpendicular to the main direction.

The inventors have also found that the local flow of forces was minimal substantially perpendicular to the direction of the fibers with which the replacement part is in contact.

In the same way as the interface area has been maximized in the direction in which the forces are exerted, it has been minimized in the direction in which the forces are minimal.

There is therefore obtained a hollowed out area of optimum size and a saving of material is obtained at the same time as optimizing the take-up of the forces exerted locally.

According to the invention, the material removal step is advantageously performed sequentially so as to expose each step in succession.

According to the invention, during the material removal step, steps are advantageously produced the height of which is equal to the thickness of the upper layer of the wall adjoining the interface area defined by said step.

Each step corresponds to a layer of the wall.

Thus an interface area is provided for each layer.

According to the invention, during the material removal step, the hollowed out area and notably the steps are advantageously produced using the high-pressure water jet cutting technique.

The machining of such a hollowed out area is particularly difficult with most of the usual machining techniques.

The water jet machining technique seems particularly advantageous for this type of application because it enables step by step machining to be effected with relatively small thicknesses. It does not impose any mechanical or thermal stress on the part. Moreover, it works at constant depth and therefore does not necessitate a complex tool path.

According to the invention, a replacement part is advantageously produced consisting of the superposition of replacement layers with thicknesses adapted to the heights of the steps.

In order to approximate the original wall as closely as possible, a replacement part is used that also consists of a plurality of layers.

The replacement part is complementary to the hollowed out area in height and in width.

This complementarity improves assembly.

Moreover, given that the replacement part and the hollowed out area are complementary, minimizing the loss of material at the level of the hollowed out area amounts to minimizing the material at the level of the replacement part and thus to savings in material for the replacement part also.

According to the invention, a replacement part is advantageously produced each replacement layer of which comprises fibers oriented in a predetermined preferred direction, and the fibers of each of the replacement layers are oriented in the main direction of the fibers of the lower layer adjoining the interface area intended to be covered by said replacement layer.

Accordingly, at the level of the interface area, the fibers of the layers of the replacement part are connected to the fibers of the wall that lie in the same direction. This optimizes the take-up of the forces.

According to the invention, the replacement layers are advantageously deposited inside the hollowed out area of the wall and assembled to each other in order to produce the replacement part and simultaneously assembled to the wall in order to carry out the assembly step.

According to the invention, the replacement part is advantageously produced before assembling it to the wall.

According to the invention, during the material removal step, steps are advantageously produced adapted to defined interface areas including an external contour of polygonal shape.

The angles in the interface area make it easier to trace the fibers of the layers.

DESCRIPTION OF THE FIGURES

Other objects, features and advantages of the invention will become apparent on reading the following description, which refers to the appended figures showing preferred embodiments of the invention, given by way of nonlimiting example only, and in which.

DETAILED DESCRIPTION OF A PREFERRED EMBODIMENT OF THE INVENTION

Description of the Figures

Figure 1:
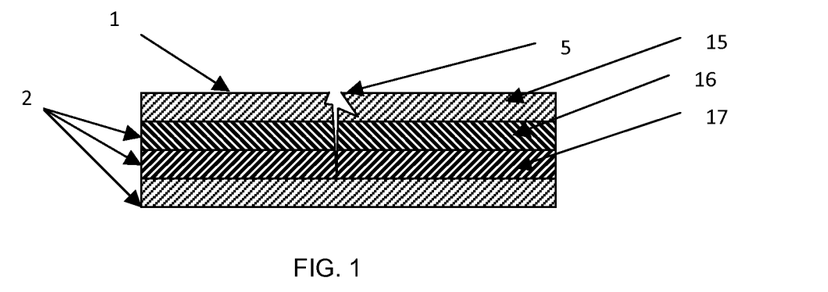
FIG. 1 is a view in section of a wall including a damaged area.

FIG. 1 shows a wall 1 consisting of a plurality of layers 2.

The layers 2 may be of similar or different materials. They generally have a thickness of the order of 0.1 to 0.4 mm.

Each layer of the wall 1 comprises fibers 3.

These fibers 3 extend totally or mainly in a direction 4 called the main direction.

The main direction 4 generally differs according to the layers. Thus two adjacent layers may comprise fibers oriented in different main directions.

The wall 1 will preferably be in composite material, that is to say a material formed of long fibers such as carbon or other fibers disposed in the form of superposed layers and buried in a resin matrix.

As shown in FIG. 1, this wall 1 includes a damaged area 5.

This damaged area 5 extends through a plurality of layers 2.

FIG. 1 shows a damaged area 5 extending through three layers 15, 16 and 17.

As indicated in FIG. 1, the first layer 15 is the surface layer of the wall 1. The second layer 16 is the layer directly beneath the first layer 15. The third layer 17 is the layer directly beneath the second layer 16.

Material Removal Step

To repair such a damaged area 5, a material removal step is carried out first. During this step, the wall 1 is hollowed out to produce a hollowed out area 6 encompassing the damaged area 5.

The hollowed out area 6 is of concave general shape.

Figure 2:
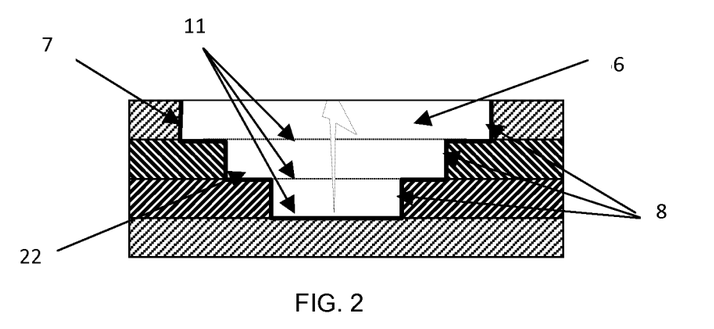
FIG. 2 is a view in section of a wall having a hollowed out area produced as in the prior art.
Figure 3:
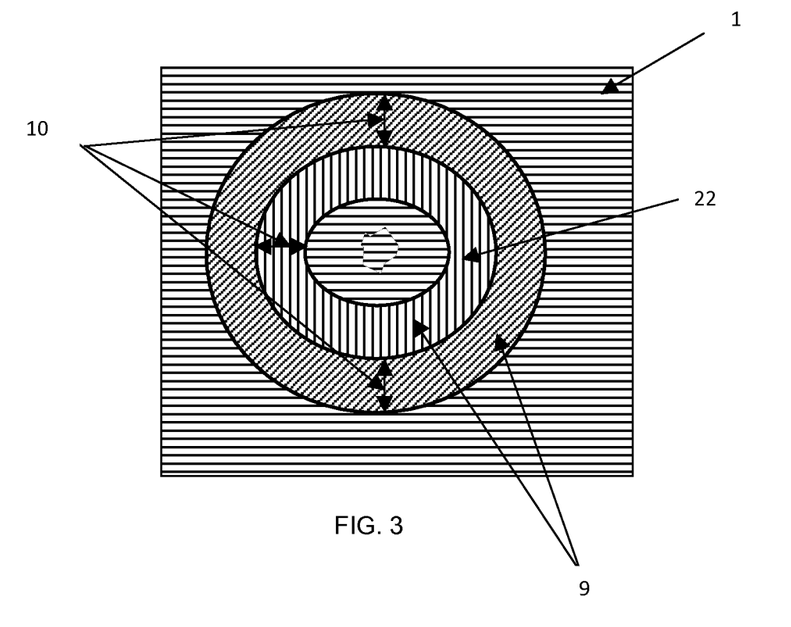
FIG. 3 is a plan view of a wall having a hollowed out area produced as in the prior art.

FIGS. 2 and 3 are views of a hollowed out area 6 as in the prior art.

The hollowed out area 6 shown in FIG. 2 includes a peripheral area 7, indicated in bold line, consisting of steps 8.

Each step has a height equal to the thickness of at least one layer.

In FIGS. 2 and 3, the height of a step is equal to the height of a layer.

Each step defines an interface area 9 that is coplanar with a junction plane of two superposed layers, called lower and upper layers, respectively extending below and above said junction plane.

Thus the interface area 22 indicated in FIG. 2 is at the junction of the 2nd layer 16 and the 3rd layer 17. For this interface area 22, the 2nd layer 16 will be the upper layer adjoining the interface area 22 and the 3rd layer 17 will be the lower layer adjoining the interface area 22.

As shown in FIGS. 2 and 3, the hollowed out area 6 as in the prior art consists of concentric ellipses formed according to a given slope.

The interface areas 9 have the same widths 10 regardless of which step 8 defines them.

Moreover, for each step 8, the interface areas 9 have the same widths 10 in all directions.

Figure 4:
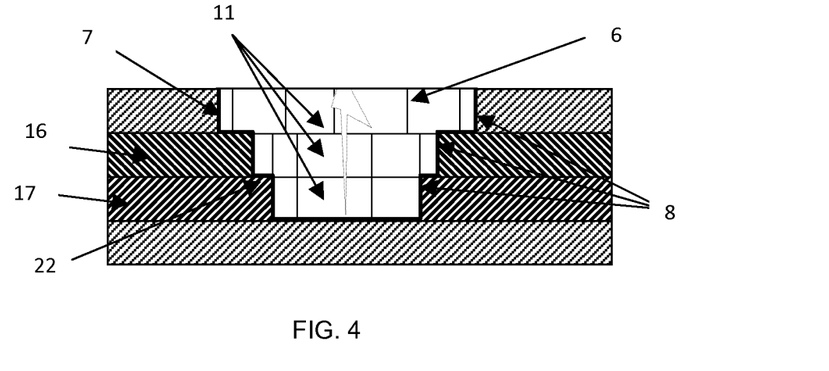
FIG. 4 is a view in section of a wall having a damaged area produced using a preferred embodiment of the invention.
Figure 5:
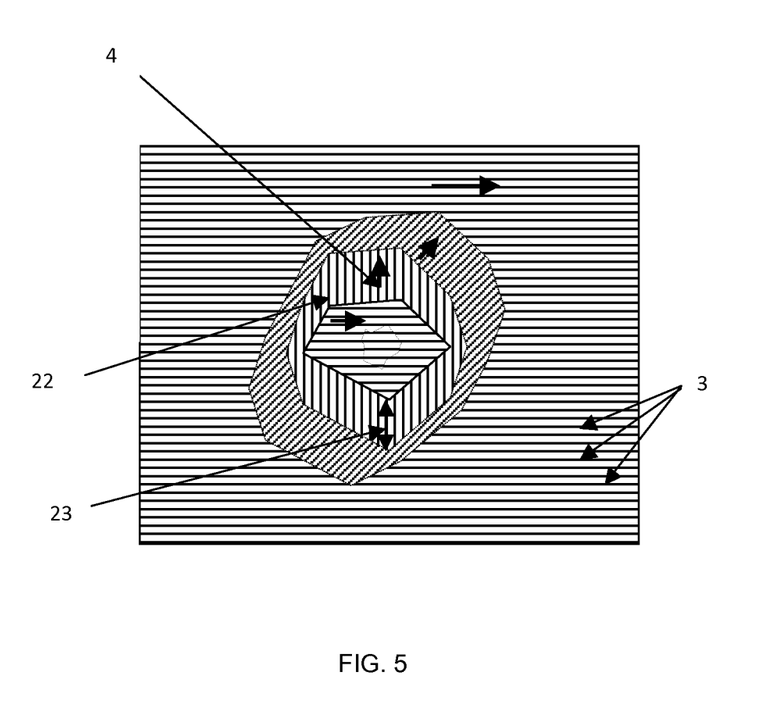
FIG. 5 is a plan view of a wall having a hollowed out area produced using a preferred embodiment of the invention.

FIGS. 4 and 5 show several views of a hollowed out area 6 in one embodiment of the invention.

During the material removal step, the wall 1 is hollowed out to produce a hollowed out area 6.

Just as in the prior art, the hollowed out area 6 of the invention includes a peripheral area 7 consisting of steps 8. Each step defines an interface area 9.

The steps 8 shown in FIG. 4 have a height equal to the thickness of the upper layer adjoining the interface area 9 defined by said step, that is to say each step has a height equal to the thickness of one layer.

However, in contrast to the prior art and as may be seen in FIG. 5, the steps 8 produced during the material removal step each define an interface area 9 having a width 10 greater in the main direction 4 of the lower layer adjoining said interface area 9 than said width 10 in directions other than the main direction 4.

As also seen in FIG. 5, the steps 8 produced during the material removal step each define an interface area 9 having a width 10 less in the direction perpendicular to the main direction 4 of the lower layer adjoining said interface area 9 than said width 10 in directions other than the direction perpendicular to this main direction 4

In fact, steps 8 are produced each defining an interface area 9 of a size between a maximum value selected for the main direction 4 of the lower layer adjoining said interface area 9 and a minimum value selected for the direction perpendicular to the main direction 4.

Thus an interface area 9 is produced of maximum size in the main direction 4 with which the replacement part 12 is in contact and of minimum size in the perpendicular direction. This main direction 4 is that in which the local forces are exerted. This method enables there to be an optimum contact area between the wall 1 and the replacement part 12.

Thus there is obtained a repair method offering optimum take-up of forces that is more economic than the standard methods in terms of the cost of materials.

The saving in materials increases with the number of damaged layers 2.

The saving in materials is evaluated in terms of the volume of materials saved but also in terms of area. The hollowed out area 6 is smaller than a hollowed out area produced by the prior art techniques, as is apparent on comparing FIGS. 3 and 5.

Thus for repairs of more than 10 layers 2, the saving in materials in terms of volume is estimated at 40% to 50%. It is also estimated that for 10 layers the area of the hollowed out area 6 on the 1st layer is 40% to 60% less than that of a hollowed out area 6 produced using a standard technique.

Moreover, minimizing the amount of material removed reduces the risk of compromising the integrity of the wall 1.

In a preferred embodiment of the invention and as shown in FIG. 5, steps 8 are produced adapted to define interface areas 9 including an external contor of polygonal shape.

As is apparent in FIG. 5, the angles of the interface area 9 make it easier to trace the fibers 3 of the layers 2.

The material removal step may be effected using machining or material removal techniques known in the art such as conventional milling, grinding or spark erosion, by a high-pressure water jet, or by chemical means.

The material removal step is preferably carried out sequentially so as to expose each step in succession.

The material removal step is preferably carried out by starting machining from the first layer.

This type of step by step or layer by layer machining where the shape changes in each layer is particularly difficult to carry out using most machining technique.

In a preferred embodiment of the invention, the hollowed out area 6 and notably the steps 8 are produced using the high-pressure water jet cutting technique.

The water jet machining technique seems advantageous for this type of application because it makes it possible to effect step by step machining of relatively small thicknesses. It does not impose any mechanical or thermal stress on the part. Moreover, it is effected at constant depth and thus does not necessitate a complex tool path.

Figure 8:
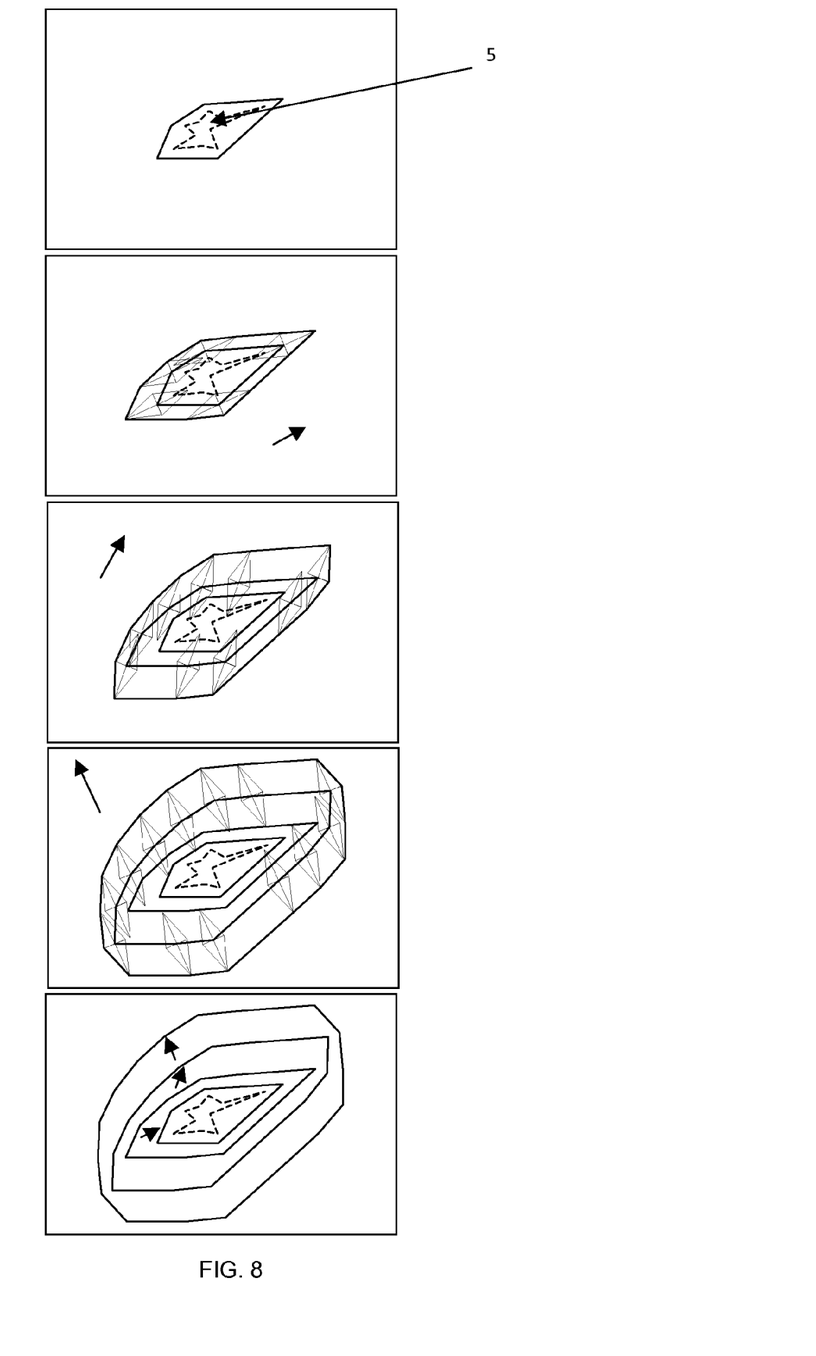
FIG. 8 shows a preferred shape of the interface area of the invention.

FIG. 8 shows an embodiment resulting in an optimum shape for the hollowed out area 6. This optimum shape is preferably designed automatically.

A wall 1 consists of a plurality of layers 2 and includes a damaged area 5 affecting three layers 15, 16 and 17, as shown in FIG. 1.

The shape of the step of the hollowed out area 6 at the level of the 3rd layer, the deepest damaged layer, is defined. This 3rd step is defined to encompass the damaged area 5 at the level of this layer whilst defining a minimum interface area 9.

The shape of the step of the hollowed out area 6 at the level of the 2nd layer, the 2nd step, is defined. To this end lozenges are modeled. In the preferred embodiment shown in FIG. 8, this lozenge has a larger diagonal D that is three times the length of its smaller diagonal d.

It is oriented so that its larger diagonal is in the main direction 4 of the lower layer adjoining the interface area 9 defined by the 2nd step, ie. the 3rd layer.

For each corner of the shape of the 3rd step, this virtual lozenge is positioned, a shape is defined that encompasses the lozenges and the shape of the 2nd step is obtained.

Similarly, for the 1st step, a virtual lozenge is positioned oriented along the fibers 3 of the 2nd layer at each corner of the 2nd step, a shape is defined that encompasses these lozenges and the shape of the 1st step is obtained.

Replacement Part Production Step

The method of the invention further includes a step of producing a replacement part 12.

The replacement part 12 is adapted to plug the hollowed out area 6 and includes, for each level 11 of the hollowed out area 6, a complementary face for covering said level 11.

The replacement part 12 may be produced in one piece or as an assembly of individual pieces.

Figure 6:
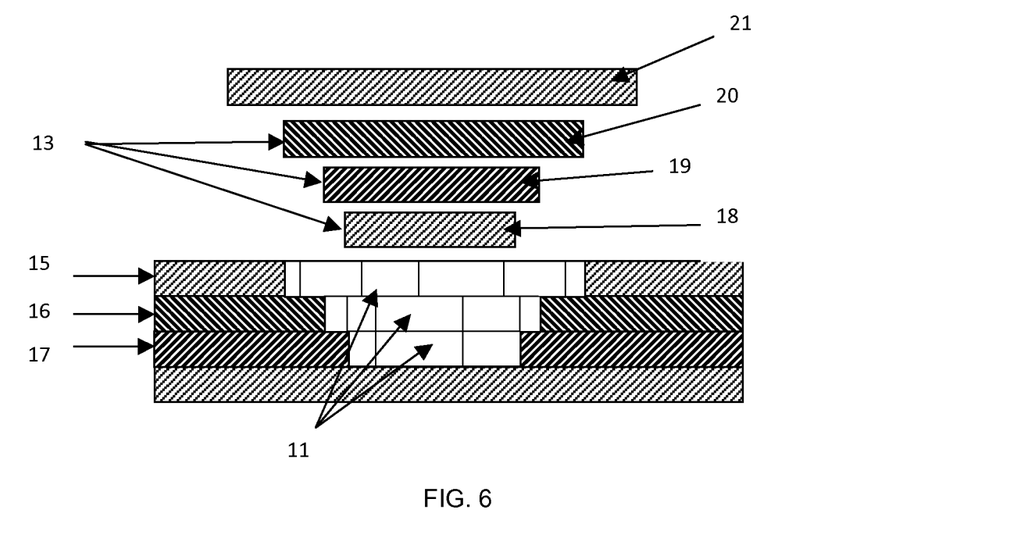
FIG. 6 is a view in section of the wall having a hollowed out area and a replacement part of one embodiment before assembly.

FIG. 6 shows a replacement part 12 consisting of a plurality of pieces.

In a preferred embodiment of the invention and as shown in FIG. 6, the replacement part 12 consists of the superposition of replacement layers 13 with thicknesses adapted to the heights of the steps 8 and dimensions adapted to cover the levels 11 defined by the steps 8.

A replacement part 12 is produced each replacement layer 13 of which comprises fibers oriented in a predetermined preferred direction, and the fibers of each of the replacement layers 13 are oriented in the main direction 4 of the fibers of the lower layer of the wall 1 adjoining the interface area 9 intended to be covered by the replacement layer 13.

Accordingly, at the level of the interface area 9, the fibers of the layers of the replacement part 12 are connected to the fibers 3 of the wall 1 that lie in the same direction. This optimizes the take-up of forces.

As shown diagrammatically in FIG. 6, the 3rd layer of the replacement part has its fibers oriented in the main direction 4 of the 4th layer of the wall 1. The 2nd layer of the replacement part has its fibers oriented in the main direction 4 of the 3rd layer of the wall 1. The 1st layer of the replacement part has its fibers oriented in the main direction 4 of the 2nd layer of the wall 1.

A supplementary layer may optionally be added to cover the replacement part 12.

Step of Assembling the Replacement Part to the Wall

The method of the invention further comprises a step of assembling the replacement part 12 to the wall 1.

Figure 7:
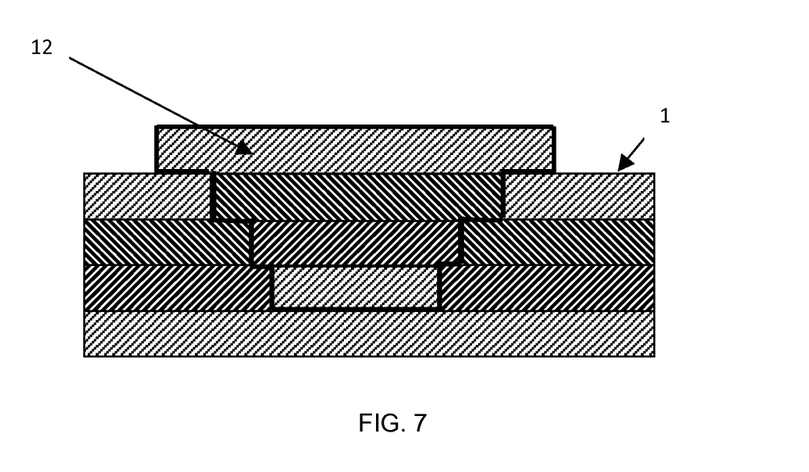
FIG. 7 is a view in section of the wall having a hollowed out area and a replacement part of one embodiment after assembly.

This assembly step is shown in FIGS. 6 and 7.

In a preferred embodiment, the replacement layers 13 are deposited successively inside the hollowed out area 6 of the wall 1. Before being deposited, these layers 2 have been impregnated with an adhesive substance, for example a thermoplastic resin. Once the replacement layers 13 have been deposited in the hollowed out area 6, the adhesive substance is activated, for example by polymerization in the case of a resin. Thus the various replacement layers 13 are assembled together to form a replacement part 12 and at the same time they are assembled to the wall 1.

In another embodiment, the replacement part 12 may be produced first and then assembled to the wall 1.

The replacement part 12 may be assembled to the wall 1 using any other known technique.

The repair method as described may be extrapolated to assembling a part consisting of a plurality of layers with a second part.

It is then not a question of assembling a wall consisting of a plurality of layers with a replacement part but of assembling a first part with a second part, the second part preferably also consisting of a plurality of layers.

Unlike repairs, which are generally effected over a small area over which the general flow of the forces exerted is substantially the same at every point, assembly may be effected over a relatively extensive area in which the general flows of the forces exerted vary.

By forces is meant physical forces such as conductivity or mechanical forces or any other forces.

It is therefore necessary beforehand to divide the assembly area into a plurality of sub-areas of smaller extent and over which the general flow of the forces exerted is substantially the same at every point.

For example, if it is required to assemble two parts of an aircraft wing, the direction of the mechanical forces exerted on the wing differs at the edge and at the center. The assembly area will therefore be divided into sub-areas for which the forces are exerted in substantially the same direction. The sub-areas may be 10 cm wide, for example.

The procedure for each sub-area is then similar to the repair procedure.

A first junction area is produced by withdrawing material from the first part to produce a first junction area consisting of steps, each step having a height equal to the thickness of at least one layer, such that each step defines an interface area as defined for repairs.

As in the repair method, during the step of the assembly method consisting in producing the first part, steps are produced each defining an interface area having a width in the preferred direction adjoining said interface area greater than said width in directions other than the preferred direction.

In the situation where optimum take-up of the local flows of forces is required, the preferred direction is the main direction of the fibers of the lower layer. The preferred direction may equally be a direction taking account of the directions of the fibers and other local force parameters.

A second part adapted to be assembled to the first junction area is produced including, for each interface area of the first junction area, a complementary face for covering said interface area. The junction area of the second part may be produced by the same method as the junction area of the first part.

The two parts are then brought into contact and fixed by means of the adhesive substance.

The invention has been described hereinabove with reference to an embodiment given by way of example only. It goes without saying that it is not limited to that embodiment but encompasses all embodiments covered by the appended claims.

The invention claimed is:

1. A method of repairing a wall (1), notably a composite wall, comprising:
   a plurality of layers (2), each layer comprising fibers (3) extending in a main direction (4), and having a damaged area (5) affecting the plurality of layers (2), said repair method comprising:
   removing a material by hollowing out the wall (1) to produce a hollowed out area (6) encompassing the damaged area (5), the hollowed out area including a peripheral area (7) including steps (8), the height of each step is equal to the thickness of at least one of the layers, each step (8) defines an interface area (9) that is coplanar with a junction plane between a lower layer and an upper layers lying below and above said junction plane, the removing step is carried out sequentially to expose each step in succession;
   producing a replacement part (12) adapted to block the hollowed out area (6), the replacement part includes superposed replacement layers having thickness adapted to the height of the steps to cover each level (11) defined by the steps, the replacement layers include fibers oriented in the main direction of the fibers of the lower layer; and
   assembling the replacement part (12) to the wall (1),
   the interface area (9) having a width (10) greater in the main direction (4) of the fibers (3) of the lower layer adjoining said interface area (9) than said width (10) in directions other than the main direction (4).

2. The repair method claimed in claim 1, wherein during the removing step, steps (8) are produced, each defining an interface area (9) having a width (10) between a selected maximum value for the main direction (4) of the fibers (3) of the lower layer adjoining said interface area (9) and a minimum value selected for the direction perpendicular to the main direction (4).

3. The repair method claimed claim 1, wherein during the removing step, steps (8) are produced, the height of which is equal to the thickness of the upper layer of the wall (1) adjoining the interface area (9) defined by said step.

4. A method of repairing a wall (1), notably a composite wall, comprising:
   a plurality of layers (2), each layer comprising fibers (3) extending in a main direction (4), and having a damaged area (5) affecting the plurality of layers (2), said repair method comprising:
   removing a material by hollowing out the wall (1) to produce a hollowed out area (6) encompassing the damaged area (5), the hollowed out area including a peripheral area (7) including steps (8), the height of each step is equal to the thickness of one of the layers, each step (8) defines an interface area (9) that is coplanar with a junction plane between a lower layer and an upper layer lying below and above said junction plane,
   producing a replacement part (12) adapted to block the hollowed out area (6), the replacement part includes superposed replacement layers having thickness adapted to the height of the steps to cover each level (11) defined by the steps, the replacement layers include fibers oriented in the main direction of the fibers of the lower layer; and
   assembling the replacement part (12) to the wall (1),
   the interface area (9) having a width (10) greater in the main direction (4) of the fibers (3) of the lower layer adjoining said interface area (9) than said width (10) in directions other than the main direction (4);
   wherein during the removing step, the hollowed out area (6) and the steps (8) are produced using the high-pressure water jet cutting technique.

5. A method of repairing a wall (1), notably a composite wall, comprising:
   a plurality of layers (2), each layer comprising fibers (3) extending in a main direction (4), and having a damaged area (5) affecting the plurality of layers (2), said repair method comprising:
   removing a material by hollowing out the wall (1) to produce a hollowed out area (6) encompassing the damaged area (5), the hollowed out area including a peripheral area (7) including steps (8), the height of each step is equal to the thickness of one of the layers, each step (8) defines an interface area (9) that is coplanar with a junction plane between a lower layer and an upper layer lying below and above said junction plane,
   producing a replacement part (12) adapted to block the hollowed out area (6), the replacement part includes superposed replacement layers having thickness adapted to the height of the steps to cover each level (11) defined by the steps, the replacement layers include fibers oriented in the main direction of the fibers of the lower layer; and
   assembling the replacement part (12) to the wall (1),
   the interface area (9) having a width (10) greater in the main direction (4) of the fibers (3) of the lower layer adjoining said interface area (9) than said width (10) in directions other than the main direction (4);
   wherein a replacement part (12) is produced having superposed replacement layers (13) with thicknesses adapted to the heights of the steps (8);
   wherein a replacement part (12) is produced, each replacement layer of which comprises fibers (3) oriented in a predetermined preferred direction and in that the fibers (3) of each of the replacement layers are oriented in the main direction (4) of the fibers (3) of the lower layer of the wall (1) adjoining the interface area (9) to be covered by said replacement layer.

6. The repair method claimed in claim 1, wherein the replacement layers (13) are deposited inside the hollowed out area (6) of the wall (1) and are assembled to each other in order to produce the replacement part (12) and simultaneously to the wall (1) in order to carry out the assembly step.

7. The repair method claimed in claim 1, wherein the replacement part (12) is produced before assembling it to the wall.

8. The repair method claimed in claim 1, wherein during the removing step, steps (8) are produced adapted to define interface areas (9) having an external contour of polygonal shape.

* * * * *